United States Patent [19]

Horsey et al.

[11] Patent Number: 5,596,033

[45] Date of Patent: Jan. 21, 1997

[54] GAS FADE RESISTANT STABILIZER SYSTEM FOR POLYPROPYLENE FIBER

[75] Inventors: Douglas W. Horsey, Briarcliff Manor; Ramanathan Ravichandran, Nanuet, both of N.Y.

[73] Assignee: Ciba-Geigy Corporation, Tarrytown, N.Y.

[21] Appl. No.: 466,519

[22] Filed: Jun. 6, 1995

Related U.S. Application Data

[63] Continuation-in-part of Ser. No. 207,909, Mar. 8, 1994, which is a continuation-in-part of Ser. No. 158,841, Nov. 29, 1993, abandoned, which is a continuation-in-part of Ser. No. 48,086, Apr. 15, 1993, abandoned.

[51] Int. Cl.$^6$ ............... C08K 5/3432; C08K 5/3492
[52] U.S. Cl. ............... 524/100; 524/99; 524/102; 524/236; 524/399
[58] Field of Search ............... 524/99, 100, 102, 524/236, 399

[56] References Cited

U.S. PATENT DOCUMENTS

| | | | |
|---|---|---|---|
| 4,360,617 | 11/1982 | Müller et al. | 524/101 |
| 4,590,231 | 5/1986 | Seltzer et al. | 524/100 |
| 4,782,105 | 11/1988 | Ravichandran et al. | 524/236 |
| 4,876,300 | 10/1989 | Seltzer et al. | 524/100 |
| 4,898,901 | 2/1990 | Ravichandran et al. | 524/237 |
| 5,013,510 | 5/1991 | Pastor et al. | 564/301 |

FOREIGN PATENT DOCUMENTS

0276923  8/1988  European Pat. Off. .

*Primary Examiner*—Kriellion S. Morgan
*Attorney, Agent, or Firm*—Luther A. R. Hall

[57] ABSTRACT

Blends of a selected long chain N,N-dialkylhydroxylamine and selected hindered amines are surprisingly effective in providing processing, long term heat aging and light stability performance and especially gas fade resistance to polypropylene fibers in the absence of a traditionally used phenolic antioxidant.

9 Claims, No Drawings

GAS FADE RESISTANT STABILIZER SYSTEM FOR POLYPROPYLENE FIBER

This is a continuation-in-part of application Ser. No. 08/207,909, filed on Mar. 8, 1994, which is a continuation-in-part of application Ser. No. 08/158,841, filed on Nov. 29, 1993, now abandoned, which is a continuation of application Ser. No. 08/048,086, filed on Apr. 15, 1993, now abandoned.

The instant invention pertains to stabilized polypropylene fiber, free or essentially free of any traditionally used phenolic antioxidant, and having enhanced light stability, enhanced long term heat stability and especially enhanced gas fade resistance. This fiber formulation is stabilized by an effective amount of a mixture of a selected hindered amine and a selected hydroxylamine.

BACKGROUND OF THE INVENTION

Polypropylene fiber is traditionally stabilized with a blend of selected phenolic antioxidant, selected phosphite and selected hindered amine light stabilizer. This formulation generally provides adequate processing, heat and light stabilization performance, but does not provide adequate gas fade resistance which is needed to maintain color properties during storage and end-use application. There is a long-felt need in the marketplace for a stabilizer system which can prevent this gas fading and color formation associated with the use of phenolic antioxidants. Gas fading is known in the industry as a discoloration resulting from the exposure of plastic articles to an atmosphere containing oxides of nitrogen.

The components of the instant stabilizer system for polypropylene fibers are generically well-known as stabilizers for a host of organic and polymeric substrates. The components of the instant stabilizer system for polypropylene fiber are a specific combination of selected 2,2,6,6-tetramethylpiperidine hindered amines and N,N-dialkylhydroxylamines, in the absence or essential absence of a phenolic antioxidant. This instant stabilizer formulation provides unexpectedly superior gas fade resistance, and heat and light stability performance properties to the polypropylene fibers which are notoriously difficult to stabilize effectively. The instant phenolic free antioxidant stabilizer system provides the best overall stabilization for polypropylene fiber. Discoloration of polypropylene fibers, when exposed to an atmosphere containing oxides of nitrogen, i.e. gas fading conditions, encountered with stabilizer systems containing phenolic antioxidants, makes such systems unacceptable in this important property even though in other performance criteria the phenolic antioxidants perform adequately.

The hindered amines are a very important class of light and thermal stabilizers based on compounds having a 2,2,6,6-tetramethylpiperidine moiety somewhere in the molecule. These compounds have achieved great commercial success and are well-known in the art.

N,N-Dialkylhydroxylamines also are known in the an as seen in U.S. Pat. Nos. 4,590,231; 4,782,105; 4,876,300 and 5,013,510. These compounds are useful as process stabilizers for polyolefins when used alone or in combination with phenolic antioxidants and/or other coadditives, particularly as taught in U.S. Pat. No. 4,876,300. Although U.S. Pat. No. 4,876,300 teaches generically that N,N-dialkylhydroxylamines can be used in combination with phenolic antioxidants, hindered amines, phosphites, UV absorbers and other additives, there is no specific disclosure that polypropylene fibers can be beneficially stabilized by the instant specific combinations of selected hindered amines and the instant specific N,N-dialkylhydroxylamine. Thus the instant invention is essentially a selection from within the broad generic scope of U.S. Pat. No. 4,876,300.

U.S. Pat. No. 4,876,300 is directed primarily to polypropylene compositions in general with only one example being directed to polypropylene fiber. In said example, the specific hydroxylamine used is N,N-di(hydrogenated tallow)hydroxylamine where the alkyl moiety is a mixture of tetradecyl, hexadecyl, heptadecyl and octadecyl groups as set forth in U.S. Pat. No. 4,876,300.

However, the instant composition is distinguished from the compositions of the prior art in several important aspects listed below:

1. Hindered phenolic antioxidants plus phosphites combinations have generally poor gas fade resistance;

2. Phosphites alone lack adequate process, thermal and light stabilization efficacy; and 3. Phosphites plus hindered amines lack adequate process stabilization.

4. Substitution of the N,N-di(hydrogenated tallow)hydroxylamine described in U.S. Pat. No. 4,876,300 by the N,N-dialkylhydroxylamine made by the direct oxidation of N,N-di(hydrogenated tallow)amine by the process of U.S. Pat. Nos. 5,013,510 or 4,898,901 leads to unexpectedly superior results in the binary compositions with selected hindered amine light stabilizers compared to the results reported in U.S. Pat. No. 4,876,300.

The instant combination of stabilizers provide all of the required requisites of gas fade resistance and process and thermal stability.

OBJECTS OF THE INVENTION

The object of this invention is to provide a stabilizer system for polypropylene fiber, in the absence of any traditionally used phenolic antioxidant or in the presence of only very low levels of phenolic antioxidant, which would allow the polypropylene fibers to have enhanced light and long term heat stability and especially enhanced gas fade resistance while maintaining process stabilization comparable to any system using phenolic antioxidants.

Another object of the instant invention is to provide a method to improve gas fade resistance and to reduce color formation in polypropylene fibers by using the instant stabilizer system essentially free of phenolic antioxidant.

DETAILED DISCLOSURE

The instant invention pertains to a binary stabilizer system where the stabilized polypropylene fiber, free or essentially free of any phenolic antioxidant, and having enhanced light stability, enhanced long term heat stability and enhanced gas fade resistance, which fiber is stabilized by an effective stabilizing amount of a mixture of (I) a hindered amine selected from the group consisting of the polycondensation product of 1-(2-hydroxyethyl)-2,2,6,6-tetramethyl-4-hydroxypiperidine and succinic acid;

the polycondensation product of 4,4'-hexamethylene-bis(amino-2,2,6,6-tetramethylpiperidine) and 2,4-dichloro-6-tert-octylamino-s-triazine;

the polycondensation product of 4,4'-hexamethylene-bis(amino-2,2,6,6-tetramethylpiperidine) and 2,4-dichloro-6-cyclohexylamino-s-triazine;

the polycondensation product of 4,4'-hexamethylene-bis(amino-2,2,6,6-tetramethylpiperidine) and 2,4-dichloro-6-morpholino-s-triazine;

poly[methyl 3-(2,2,6,6-tetramethylpiperidin-4-yloxy)propyl]siloxane;

bis(2,2,6,6-tetramethylpiperidin-4-yl) cyclohexylenedioxydimethylmalonate;

1,3,5-tris{N-cyclohexyl-N-[2-(2,2,6,6-tetramethylpiperazin-3-on-4-yl)ethyl]amino-s-triazine;

N,N',N'',N'''-tetrakis[4,6-bis(butyl-(2,2,6,6-tetramethylpiperidin-4-yl)amino)-s-triazin-2-yl]-1,10-diamino-4,7-diazadecane; and the polycondensation product of 2,4-dichloro-6-(2,2,6,6-tetramethylpiperidin4-yl)butylamino-s-triazine and 2,2'-ethylene-bis{[2,4-(2,2,6,6-tetramethylpiperidin-4-yl)butylamino-s-triazin-6-yl]aminotrimethyleneamino}; and (II) the N,N-dialkylhydroxylamine product made by the direct oxidation of N,N-di(hydrogenated tallow)amine by the process of U.S. Pat. No. 5,013,510 or 4,898,901; wherein the weight ratio of components (I):(II) is from 100:1 to 1:2; preferably 10:1 to 1:1; and most preferably 5:1 to 3:1.

The effective amount of the mixture of stabilizers is from 0.025 to 5%, preferably 0.05 to 2%, most preferably 0.1 to 1%, by weight based on the weight of the fiber.

The instant invention involves a selected mixture of stabilizers which are free or essentially free of any phenolic antioxidants. Some manufacturers of polypropylene add tiny amounts, usually <0.01% by weight of phenolic antioxidant, to aid in the initial manufacture of the polypropylene resin. The amount of phenolic antioxidant remaining in the resin used to prepare polypropylene fiber is far less than the 0.05% by weight of phenolic antioxidant used in the working examples of U.S. Pat. No. 4,876,300. As the phrase free or essentially free of phenolic antioxidant as used in the context of the instant invention means 0 to 0.01% by weight of phenolic antioxidant may be present in the instant compositions. No phenolic antioxidant is deliberately added to the instant compositions in order to achieve the stabilization efficacies described.

Another most important aspect of the instant invention is a method for improving gas fade resistance and reducing color formation in stabilized polypropylene fiber by incorporating therein an effective stabilizing amount of the mixture of stabilizers described above without the loss of any other stabilization property.

Still another aspect of the instant invention is to a method for enhancing the resistance to degradation of polypropylene fiber, due to exposure to UV radiation over that which can be achieved by the use of conventional stabilizers alone, by incorporating therein an effective stabilizing amount of the instant mixture of stabilizers described above.

Yet another aspect of the instant invention is to a method for enhancing the thermal stability of polypropylene fiber, over that which can be achieved by the use of conventional stabilizers alone, by incorporating therein an effective stabilizing amount of the mixture of stabilizers described above.

The cited hindered amines are generally commercially available or can be made by published methods.

The N,N-dialkylhydroxylamines are prepared by methods disclosed in U.S. Pat. Nos. 4,782,105; 4,898,901 and particularly 5,013,510 by the direct oxidation of N,N-di(hydrogenated tallow)amine by hydrogen peroxide.

The polypropylene fiber may also contain other stabilizers such as phosphites and other additives such as fillers and reinforcing agents such as calcium carbonate, silicates, glass fibers, asbestos, talc, kaolin, mica, barium sulfate, metal oxides and hydroxides, carbon black, graphite and other additives, for example, plasticizers, lubricants, emulsifiers, pigments, optical brighteners, flameproofing agents and anti-static agents.

Conventional stabilization systems, such as phenolic antioxidant with phosphite and hindered amine stabilizer, or phosphite with hindered amine stabilizer, can provide excellent stabilization to polypropylene fibers in selected performance areas, but it is only through the use of the instant binary combination of a selected hindered amine and a special selected hydroxylamine that all of the important performance properties for stabilized polypropylene fibers can be optimized.

Polypropylene is used extensively for the manufacture of fiber for residential, commercial and automotive carpeting. White and light-colored fiber can suffer from discoloration due to gas fade discoloration. Polypropylene resin as it is originally manufactured may contain very low levels of phenolic antioxidant for stability till said resin is later fabricated into fiber. In each case some additional stabilizer package may be added to the propylene resin before fabrication into fiber is possible. Hindered phenolic antioxidants are well-known as a potential source of such discoloration by the formation of quinone type chromophores as oxidation products or as the result of environmental exposure to the oxides of nitrogen (known as "gas fade" discoloration).

It is therefore desirable to remove the phenolic antioxidant component from the resin used to prepare the polypropylene fiber. Unfortunately when this has been done in the past, other properties related to polymer stability are adversely effected. Phenolic antioxidants protect the polymer during high temperature melt processing, extrusion and spinning operations. Phenolic antioxidants further protect the polymer pellets and resultant fiber during storage and final end-use applications.

Surprisingly, it was found that the phenolic antioxidant could be replaced in the instant stabilizer system which is a binary combination of a selected hindered amine and a special selected hydroxylamine. Said system provides stability in excess of that obtained with conventional stabilizer systems having a phenolic antioxidant component without the discoloration associated with the phenolic antioxidant when the stabilized polypropylene fiber is exposed to gas fading conditions, i.e. in an atmosphere containing the oxides of nitrogen.

The following examples are presented for the purpose of illustration only and are not to be construed to limit the nature or scope of the instant invention in any manner whatsoever.

Test Compounds

HALS 1=the polycondensation product of 4,4'-hexamethylene-bis(amino-2,2,6,6-tetramethylpiperidine) and 2,4-dichloro-6-tert-octylamino-s-triazine;

HALS 2=the polycondensation product of 1-(2-hydroxyethyl)-2,2,6,6-tetramethyl-4-hydroxypiperidine and succinic acid;

HALS 3=N,N',N'',N'''-tetrakis[4,6-bis(butyl-(2,2,6,6-tetramethylpiperidin-4-yl)-amino)-s-triazin-2-yl]-1,10-diamino-4,7-diazadecane;

HALS 4=the polycondensation product of 4,4'-hexamethylene-bis(amino-2,2,6,6-tetramethylpiperidine) and 2,4-dichloro-6-morpholino-s-triazine;

HALS 5=poly[methyl 3-(2,2,6,6-tetramethylpiperidin-4-yloxy)propyl]siloxane;

HALS 6=bis(2,2,6,6-tetramethylpiperidin-4-yl) cyclohexylenedioxydimethylmalonate;

HALS 7=1,3,5-tris{N-cyclohexyl-N-[2-(2,2,6,6-tetramethylpiperazin-3-on-4-yl)ethyl]amino-s-triazine;

HALS 8=the polycondensation product of 2,4-dichloro-6-(2,2,6,6-tetramethyl-piperidin-4-yl)butylamino-s-triazine and 2,2'-ethylene-bis{[2,4-(2,2,6,6-tetramethyl-piperidin-4-yl)butylamino-s-triazin-6-yl]aminotrimethyleneamino};

HA A=the N,N-dialkylhydroxylamine product made by the direct oxidation of N,N-di(hydrogenated tallow)amine by the process of U.S. Pat. No. 5,013,510 or 4,898,901; and HA B=N,N-dialkylhydroxylamine of the formula $T_1T_2NOH$ where $T_1$ and $T_2$ are the alkyl mixture found in hydrogenated tallow amine as set forth in U.S. Pat. No. 4,876,300.

All additives are designated in % by weight based on the polypropylene.

Example 23 of U.S. Pat. No. 4,876,300 shows that a combination of hindered amine (HALS 1) and hydroxylamine (HA B) enhances the level of light stabilization for polypropylene fiber beyond that obtained by using the stabilizers alone. The instant invention shows that substitution of the hydroxylamine HA B by the hydroxylamine HA A unexpectedly improves that enhanced light stabilization unexpectedly and surprisingly more.

EXAMPLE 1

Light Stabilization of Polypropylene Fiber

Fiber-grade polypropylene, containing 0.05% by weight of calcium stearate, is dry blended with the test additives and then melt compounded at 246° C. (475° F.) into pellets. The pelletized fully formulated resin is then spun at 274° C. (525° F.) into fiber using a Hills laboratory model fiber extruder. The spun tow of 41 filaments is stretched at a ratio of 1:3.2 to give a final denier of 615/41.

The fibers are exposed to UV light and to long term thermal aging under standard conditions.

Socks knitted from the stabilized polypropylene fibers are exposed in an Atlas Xenon-Arc-WeatherOmeter using the SAE J1885 Interior Automotive conditions at 89° C., 0.55 kW/cm$^2$ at 340 nm with no spray cycle. Failure in this test is determined by the observation of the physical failure of the sock when it is "scratched" with a blunt glass rod. The longer it takes for this catastrophic failure to occur, the more effective is the stabilizer system.

The test additives used in this Example are hydroxylamines HA A and HA B, each tested alone and each also in combination with selected hindered amines. The instant formulations containing selected hindered amines and the special hydroxylamine HA A provide a level of light stabilization surprisingly superior to that found for polypropylene fiber stabilized with the formulation described in U.S. Pat. No. 4,876,300.

EXAMPLE 2

Long Term Heat Stability of Polypropylene Fiber

In the long term heat aging at 120° C., other knitted socks of the stabilized polypropylene fiber are exposed in a forced draft oven equipped with a rotating carousel. Again, failure is determined as described above. The longer it takes for such catastrophic failure to occur, the more efficacious is the stabilizer system.

Again, the instant formulations containing selected hindered amines and the special instant hydroxylamine HA A provide a level of long term heat stabilization surprisingly superior to that for polypropylene fiber stabilized with the formulation described in U.S. Pat. No. 4,876,300.

What is claimed is:

1. A stabilized polypropylene fiber, having enhanced light stability, enhanced long term heat stability and enhanced gas fade resistance, which fiber is stabilized by an effective stabilizing amount of a mixture of (I) a hindered amine selected from the group consisting of
 the polycondensation product of 1-(2-hydroxyethyl)-2,2,6,6-tetramethyl-4-hydroxypiperidine and succinic acid;

the polycondensation product of 4,4'-hexamethylene-bis(amino-2,2,6,6-tetramethylpiperidine) and 2,4-dichloro-6-tert-octylamino-s-triazine;

the polycondensation product of 4,4'-hexamethylene-bis(amino-2,2,6,6-tetramethylpiperidine) and 2,4-dichloro-6-cyclohexylamino-s-triazine;

the polycondensation product of 4,4'-hexamethylene-bis(amino-2,2,6,6-tetramethylpiperidine) and 2,4-dichloro-6-morpholino-s-triazine;

poly[methyl 3-(2,2,6,6-tetramethylpiperidin-4-yloxy)propyl]siloxane;

bis(2,2,6,6-tetramethylpiperidin-4-yl) cyclohexylenedioxydimethylmalonate;

1,3,5-tris{N-cyclohexyl-N-[2-(2,2,6,6-tetramethylpiperazin-3-on-4-yl)ethyl]amino-s-triazine;

N,N',N'',N'''-tetrakis[4,6-bis(butyl-(2,2,6,6-tetramethylpiperidin-4-yl)amino)-s-triazin-2-yl]-1,10-diamino-4,7-diazadecane; and the polycondensation product of 2,4-dichloro-6-(2,2,6,6-tetramethylpiperidin-4-yl)butylamino-s-triazine and 2,2'-ethylene-bis{[2,4-(2,2,6,6-tetramethylpiperidin-4-yl)butylamino-s-triazin-6-yl]aminotrimethyleneamino}; and (II) the N,N-dialkylhydroxylamine product made by the direct oxidation of N,N-di(hydrogenated tallow)amine; wherein the weight ratio of components (I):(II) is from 100:1 to 1:2.

2. A stabilized fiber according to claim 1 wherein the weight ratio of components (I):(II) is from 10:1 to 1:1.

3. A stabilized fiber according to claim 2 wherein the weight ratio of components (I):(II) is from 5:1 to 3.1.

4. A stabilized fiber according to claim 1 wherein the effective stabilizing amount of the mixture of stabilizers is from 0.025 to 5% by weight based on the weight of the fiber.

5. A stabilized fiber according to claim 4 wherein the effective stabilizing amount of the mixture of stabilizers is from 0.05 to 2% by weight based on the weight of the fiber.

6. A stabilized fiber according to claim 5 wherein the effective stabilizing amount of the mixture of stabilizers is from 0.1 to 1% by weight based on the weight of the fiber.

7. A method for enhancing gas fade resistance and reducing color formation in stabilized polypropylene fiber, without the loss of any other stabilization property, by incorporating therein an effective stabilizing amount of the mixture of stabilizers according to claim 1.

8. A method for enhancing the resistance to degradation of polypropylene fiber, due to exposure to UV radiation over that which can be achieved by the use of conventional stabilizers alone, by incorporating therein an effective stabilizing amount of the mixture of stabilizers according to claim 1.

9. A method for enhancing the long term heat stability of polypropylene fiber, due to exposure to elevated temperatures over that which can be achieved by the use of conventional stabilizers alone, by incorporating therein an effective stabilizing amount of the mixture of stabilizers according to claim 1.

* * * * *